United States Patent
Thornley et al.

(10) Patent No.: US 12,026,630 B2
(45) Date of Patent: Jul. 2, 2024

(54) ARTIFICIAL INTELLIGENCE METHODS AND SYSTEMS FOR IMPROVING USER ADAPTABILITY USING TEXTUAL COMMUNICATION

(71) Applicant: Adaptai Ltd., Dorset (GB)

(72) Inventors: Ross Thornley, Hampshire (GB); Michael Raven, Bournemouth (GB); Nicolas Deuschel, Zurich (CH)

(73) Assignee: Adaptai Ltd., Dorset (GB)

( * ) Notice: Subject to any disclaimer, the term of this patent is extended or adjusted under 35 U.S.C. 154(b) by 0 days.

(21) Appl. No.: 16/578,510

(22) Filed: Sep. 23, 2019

(65) Prior Publication Data
US 2021/0089934 A1    Mar. 25, 2021

(51) Int. Cl.
*G06N 5/04*    (2023.01)
*G06F 40/30*    (2020.01)
*G06N 20/00*    (2019.01)

(52) U.S. Cl.
CPC .............. *G06N 5/04* (2013.01); *G06F 40/30* (2020.01); *G06N 20/00* (2019.01)

(58) Field of Classification Search
CPC ................................. G06N 5/04; G06F 40/30
See application file for complete search history.

(56) References Cited

U.S. PATENT DOCUMENTS

| | | | |
|---|---|---|---|
| 8,538,955 B2 | 9/2013 | Hu et al. | |
| 10,127,214 B2 | 11/2018 | Munro | |
| 10,255,273 B2 | 4/2019 | Chakraborty | |
| 10,333,881 B2 | 6/2019 | Edgar | |
| 2008/0154828 A1* | 6/2008 | Antebi | G06N 5/022 706/46 |
| 2011/0320187 A1* | 12/2011 | Motik | G06F 16/3329 704/9 |
| 2016/0196758 A1* | 7/2016 | Causevic | A61B 5/165 434/236 |

(Continued)

OTHER PUBLICATIONS

Wintaro, Marielle "Personality testing with the Psychometer: towards an adaptive test." U of Twente [Published 2009] [Retrieved Mar. 2020] <URL:https://pdfs.semanticscholar.org/e3bd/bb9c93bdcd7bac768a966aad6b5b42723c30.pdf> (Year: 2009).*

(Continued)

*Primary Examiner* — Ann J Lo
*Assistant Examiner* — Fen Christopher Tamulonis
(74) *Attorney, Agent, or Firm* — Caldwell Intellectual Property Law

(57) ABSTRACT

An artificial intelligence system for improving user adaptability using textual communication includes a communication device, the communication device configured to initiate a textual communication session with a user input, and using the textual communication session, at least a first textual datum from the user, identify, using a language processing model, at least an adaption problem category using the at least a first textual datum, determine an adaptability profile of the at least a user, generate at least an adaption solution as a function of the at least a first textual datum, the at least an adaption problem category, and the adaptability profile, and output at least a second textual datum to the user as a function of the adaption solution.

14 Claims, 4 Drawing Sheets

(56) References Cited

U.S. PATENT DOCUMENTS

| | | | |
|---|---|---|---|
| 2016/0262680 A1* | 9/2016 | Martucci | A61B 5/4088 |
| 2017/0255689 A1* | 9/2017 | Khatravath | G06F 16/9035 |
| 2017/0286621 A1* | 10/2017 | Cox | G16H 50/20 |
| 2017/0293681 A1 | 10/2017 | Blandin et al. | |
| 2017/0344532 A1 | 11/2017 | Zhou et al. | |
| 2018/0032884 A1* | 2/2018 | Murugeshan | G06N 5/04 |
| 2018/0129938 A1 | 5/2018 | Xiong et al. | |
| 2018/0189857 A1 | 7/2018 | Wu et al. | |
| 2018/0268728 A1 | 9/2018 | Burdis | |
| 2018/0315499 A1 | 11/2018 | Appelbaum et al. | |
| 2018/0357221 A1 | 12/2018 | Galitsky | |
| 2018/0357272 A1 | 12/2018 | Bagchi et al. | |

OTHER PUBLICATIONS

Pereira, Juanan "Leveraging chatbots to improve self-guided learning through conversational quizzes" TEEM '16 [Published 2016] [Retrieved Mar. 2020] <URL: https://dl.acm.org/doi/abs/10.1145/3012430.3012625> (Year: 2016).*

Kapasi, Mehjabin "Let Watson recommend your next job" IBM Blogs [Published 2017] [Retrieved Mar. 2020] <URL: https://www.ibm.com/blogs/watson/2017/02/let-watson-recommend-next-job/> (Year: 2017).*

Calvo, Daniel et al. "Multiplatform Career Guidence System Using IBM Watson, Google Home and Telegram" UCAml2017 [Published 2017] [Retrieved Mar. 2020] <URL: https://link.springer.com/chapter/10.1007/978-3-319-67585-5_67> (Year: 2017).*

Bodewitz, Marcel "Detecting the student personality" University of Twente [Published 2004] [Retrieved Mar. 2020] <URL: https://www.semanticscholar.org/paper/Detecting-the-student-personality-Bodewitz/172c75dc41e44a4977ba18153027c9fa7ba6c7a7> (Year: 2004).*

Rudolph, Cort W. "Career adaptability: A meta-analysis . . . " Journal of Vocational Behavior vol. 98 [Published Feb. 2017] [Retrieved Mar. 2020] <URL: https://www.sciencedirect.com/science/article/pii/S0001879116300604> (Year: 2017).*

Liyanagamage, Ridmal et al. "A Hybrid Agent System to Detect Stress using emotions and social media data to provide coping methodologies." SLAAI-ICAI 2018 [Published Jul. 2019] [Retrieved Mar. 2021] <URL: https://link.springer.com/chapter/10.1007/978-981-13-9129-3_17> (Year: 2019).*

Bauer, Tobias et al. "#MeTooMaastricht: Building a chatbot to assist survivors of sexual harassment" arXiv [published Sep. 2019] [Retrieved Jul. 2021] arXiv:1909.02809 <URL: https://arxiv.org/abs/1909.02809> (Year: 2019).*

Tielman, M.L., Neerincx, M.A., Pagliari, C. et al. Considering patient safety in autonomous e-mental health systems—detecting risk situations and referring patients back to human care. BMC Med Inform Decis Mak 19, 47 (2019). https://doi.org/10.1186/s12911-019-0796-x (Year: 2019).*

Cameron, G., Cameron, D., Megaw, G., Bond, RR., Mulvenna, M., O'Neill, S., Armour, C., & McTear, M. (2018). Best practices for designing chatbots in mental healthcare—A case study on iHelpr. (HCI-2018) BCS Learning & Development Ltd. https://doi.org/10.14236/ewic/HCI2018.129 (Year: 2018).*

Unnamed "Definition and Meaning of previous" Merriam-Websters dictionary. <URL: https://www.merriam-webster.com/dictionary/previous> (Year: 2022).*

Ara, K., Akitomi, T., Sato, N., Takahashi, K., Maeda, H., Yano, K., & Yanagisawa, M. (2012). Integrating wearable sensor technology into project-management process. Journal of Information Processing, 20(2), 406-418. (Year: 2012).*

Borghini, G., Aricò, P., Di Flumeri, G., Sciaraffa, N., Colosimo, A., Herrero, M. T., . . . & Babiloni, F. (2017). A new perspective for the training assessment: machine learning-based neurometric for augmented user's evaluation. Frontiers in Neuroscience, 11, 325. (Year: 2017).*

Li, Yanen et al. "Unsupervised identification of synonymous query intent templates for attribute intents" CIKM '13: Proceedings of the 22nd ACM international conference on Information & Knowledge Management Oct. 2013 pp. 2029-2038 https://doi.org/10.1145/2505515.2505694 (Year: 2013).*

Shabariram et al.; International Journal of Advanced Research in Computer Science and Software Engineering; Mar. 2017.

* cited by examiner

ARTIFICIAL INTELLIGENCE METHODS AND SYSTEMS FOR IMPROVING USER ADAPTABILITY USING TEXTUAL COMMUNICATION

FIELD OF THE INVENTION

The present invention generally relates to the field of language processing. In particular, the present invention is directed to artificial intelligence methods and systems for improving user adaptability using textual communication.

BACKGROUND

Use of textual content received from a user to assess adaptability is a challenging prospect. Existing methods have failed to capture the nuance of language analysis the complexity of the underlying calculations.

SUMMARY OF THE DISCLOSURE

In an aspect, an artificial intelligence method of improving user adaptability using textual communication includes initiating, by a communication device, a textual communication session with a user. The method includes inputting, by the communication device and using the textual communication session, at least a first textual datum from the user. The method includes identifying, by the communication device and using a language processing model, at least an adaption problem category using the at least a first textual datum. The method includes determining, by the communication device, an adaptability profile of the at least a user. The method includes generating, by the communication device, at least an adaption solution as a function of the at least a first textual datum, the at least an adaption problem category, and the adaptability profile. The method includes outputting, by the communication device, at least a second textual datum to the user as a function of the adaption solution.

In another aspect, an artificial intelligence system for improving user adaptability using textual communication includes a communication device, the communication device configured to initiate a textual communication session with a user input, and using the textual communication session, at least a first textual datum from the user, identify, using a language processing model, at least an adaption problem category using the at least a first textual datum, determine an adaptability profile of the at least a user, generate at least an adaption solution as a function of the at least a first textual datum, the at least an adaption problem category, and the adaptability profile, and output at least a second textual datum to the user as a function of the adaption solution.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of the disclosed systems and methods use language processing and artificial intelligence to communicate with users for the purposes of determining, improving, and reassessing a degree of adaptability to changing situations. Artificial intelligence determination of adaptability may be paired with pragmatic assessment of instant situations to generate accurate results.

Prediction and improvement of a person's ability to adapt to changing circumstances, such as changing or novel workplace conditions or roles, presents unique challenges in language processing and artificial intelligence domains. Prediction of adaptability involves weighing many factors which may vary according to circumstance as well as between people. Communication on the subject is made difficult by the fact that people react idiosyncratically to communication regarding both initial assessments of their tendencies and discussion of resultant challenges. Even where fundamentally the matters to be assessed are amenable to generally uniform psychological factors, people may have divergent semantic characterizations of such factors that can defeat static questioning processes such as a typical questionnaire. Furthermore, people often cling to a desire to see themselves as unique or as too complex to be reduced to a formula, despite the ability of statistical analysis to describe even complex phenomena. Emotional responses both to situations where adaptability is of issue and to attempts to assess or improve responses to such situations can frustrate communication. Unfortunately, discussion of such emotional responses and phenomena is singularly prone to the above-described semantic challenges, as user descriptions of their own emotional state and response to changing circumstances is particularly prone to vagueness and variability. Thus, generation of effective responses to user communication regarding adaptability and improvements thereto requires novel approaches to language analysis and processing in order to frustrate users' production of intentional and unintentional barriers to such communication.

Figure 1:
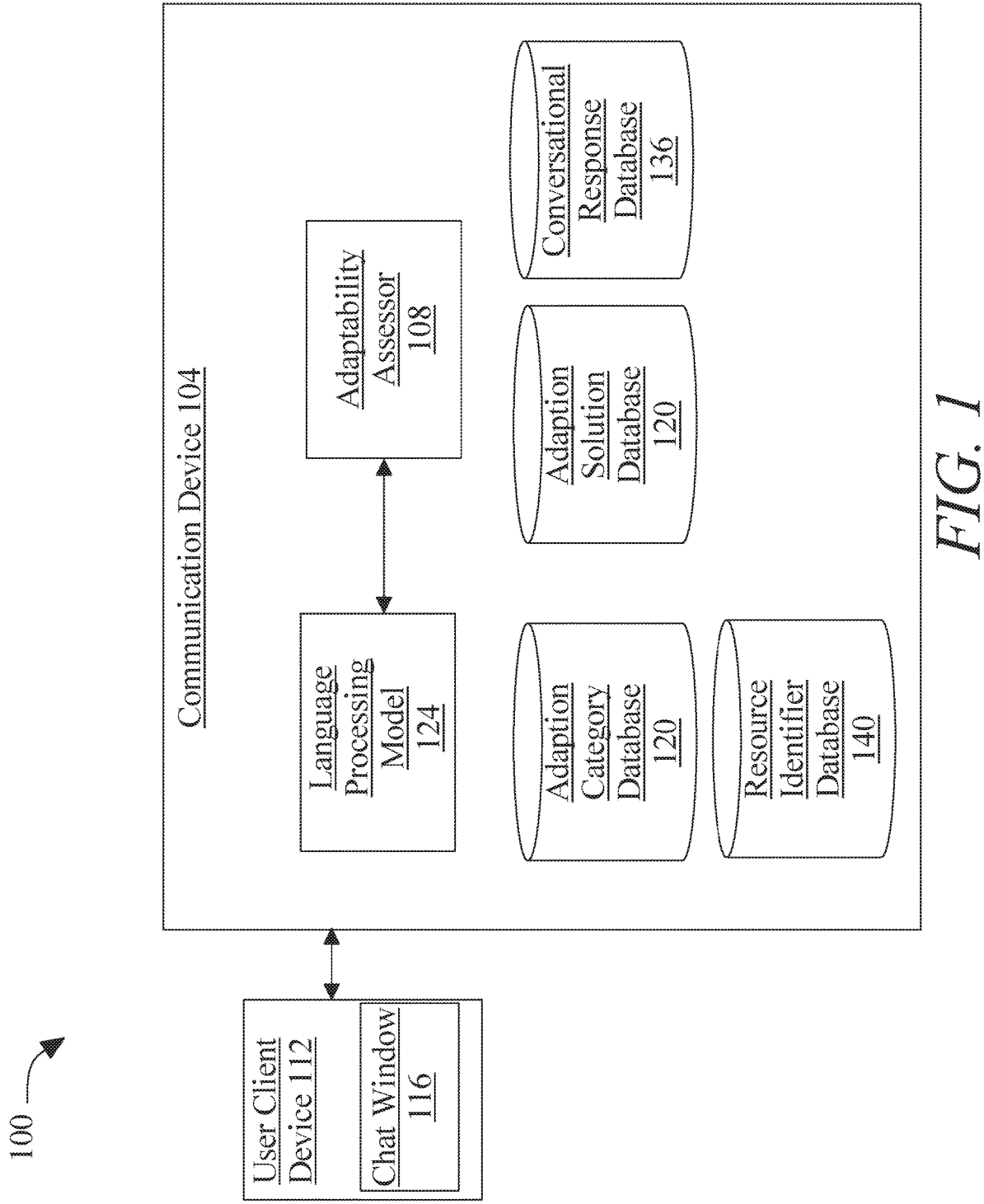
FIG. 1 is a block diagram illustrating an exemplary embodiment of an artificial intelligence system for improving user adaptability using textual communication.

Referring now to the drawings, FIG. 1 illustrates an exemplary system 100 for improving user adaptability using textual communication. System 100 includes a communication device 104. Communication device 104 may be any computing device as described in this disclosure. Communication device 104 may be any combination of computing devices as described in this disclosure. Communication device 104 may be connected to a network as described in this disclosure; the network may be the Internet. Communication device 104 may include, for instance, a first server or cluster of servers in a first location and a second server or cluster of servers in a second location. Communication device 104 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Communication device 104 may include one or more computing devices dedicated to data storage, security, distribution of traffic for load balancing, and the like. Communication device 104 may distribute one or more computing tasks as described below across a plurality of computing devices of communication device 104, which may operate in parallel, in series, redundantly, or in any other manner used for distribution of tasks or memory between computing devices. Communication device 104 may be implemented using a "shared nothing" architecture in which data is cached at the worker; in an embodiment, this may enable scalability of system 100 and/or communication device 104.

Still referring to FIG. 1, communication device 104 may be designed and/or configured to perform any method, method step, or sequence of method steps in any embodiment described in this disclosure, in any order and with any degree of repetition. For instance, communication device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Communication device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, communication module may include and/or be in communication with an adaptability assessor 108; adaptability assessor 108 may be instantiated in any form suitable for use as a software and/or hardware module as described in this disclosure. Adaptability assessor 108 may be designed and configured to generate an adaptability indicative of a user's current ability to adapt to new or modified circumstances. As used in this disclosure, "adaptability" is a measurable trait of a user that indicates a degree to which the user is able to cope effectively with change and uncertainty; as a non-limiting example, adaptability may indicate a degree to which a user is able to adjust to change and uncertainty in a work environment. Adaptability may be represented in system 100 by an adaptability score, or "adaptability quotient," which may be a numerical quantity representing a degree of user adaptability; adaptability may alternatively or additionally be represented by an adaptability profile, which may be a profile including any questionnaire responses, user entries, entries by additional users concerning user, or the like. Adaptability profile may include an adaptability score, which may be calculated according to any process and/or process steps described below. Any trait, entry, or other data usable to calculate adaptability score may be included in an adaptability profile. An adaptability profile may include explanatory text, pictures, graphs, videos, and/or other information interpreting and/or explaining any entry and/or datum in adaptability profile, including without limitation adaptability score. Adaptability assessor 108 may be designed and/or configured to assemble any and all elements of adaptability profile and present such elements as, for instance, a web page, a report, a profile, or the like; adaptability profile and/or score may be accessible only to user and/or system, may be accessible to only a particular group of users such as without limitation team members, supervisors, and/or any group of users for whom user has granted access to adaptability profile and/or score. Adaptability assessor 108 may be configured to generate, update, and/or recalculate an adaptability score using a questionnaire, as described in further detail below, using at least machine-learning method, and/or by any other suitable means as described herein. In an embodiment, and without limitation, computation of an adaptability score may be performed by providing, in a graphical user interface, an electronic questionnaire. Electronic questionnaire may include a plurality of questions directed to a user, each question having a corresponding data entry field; data entry fields may include without limitation discrete numerical entry fields permitting the user to enter one of a finite set of discrete values on a range, such as an ability to enter one to 10 "stars" indicating a degree of accordance with a question, for instance for a self-assessment or as part of an assessment of another user, continuous numerical entry fields permitting a user to enter a value on a continuous numerical range, such as a "slider," a multiple choice field set permitting a user to enter one or more of a range of multiple choice answers, a free-form text entry field where a user can enter one or more words or other text in response to a question, or the like.

Still referring to FIG. 1, an adaptability score of a user may depend on one or more traits and or additional measures of attributes relating to a person. Without limitation, a first attribute may include ability, which may indicate an ability of a user to adapt as a personal skill and/or resource. Ability may vary with time, for instance by improving in response to training, practice, and/or coaching. Ability may be determined in turn by assessing resilience, or a user's ability to persevere and recover in the face of adversity. For instance a questionnaire concerning a user's resilience may prompt a user to enter data indicative of a degree of accordance with a series of statements, for instant using a discrete numerical entry field having a maximal value indicating maximal accordance, a minimal value indicating disagreement or minimal accordance, and intermediate value indicating one or more intermediate degrees of accordance; exemplary statements may include, as a non-limiting and illustrative example, "after hard times I bounce back fast," "after a stressful event it takes me a great deal to come back to normal," "I usually find it hard to come through hard times, and "when I face a stressful situation I normally recover fast."

With further reference to FIG. 1, ability may further be determined according to a measure of flexibility, which may be an indication of a degree to which a user is willing and/or able to modify activities and/or routines. For instance, a questionnaire may assess a user's flexibility by having a user enter data using, without limitation, continuous numerical range entry fields, to indicate how frequently over a period of time, such as a year previous to the entry of data, that a user engaged in a range of described activities, such as without limitation: (1) "In a typical day, are you searching for new possibilities such as new ideas for processes or opportunities?"; (2) "Evaluating various different options with respect to matters of import"; (3) "Activities requiring a fair amount of adaptability"; (4) "Focusing on revising existing processes"; (5) "Activities which meant you had to learn new skills or knowledge"; (6)"Activities which you can properly engage in using your present knowledge;" (7) "Activities where it is clear to you how to go about them"; (8) "Activities in areas where you feel you have gained a lot of experience"; and/or (10) "Activities which you carry out as if they were routine."

Continuing to refer to FIG. 1, ability may be further determined according to one or more measures of learning drive, which may be a trait indicative of a degree to which a user seeks out chances to learn new skills and/or roles. Learning drive may be measured, as a non-limiting example, in a questionnaire section containing a plurality of multiple choice entry options, in each of which a user may select either of a pair of multiple choice entries corresponding to a pair of alternative statements; non-limiting examples include "I often ask for more tasks after I have completed something" vs. "I prefer finishing my tasks completely and then waiting until I receive new tasks"; "I actively request more responsibilities" vs. "I prefer keeping my current responsibilities"; and/or "I search for more odd jobs" vs. "I stay with clear jobs." Further measurement may include prompting user to enter a degree of accordance with one or more statements, for instance using discrete numerical range entries and/or continuous numerical range entries; options may include, without limitation, data entry fields associated with "I prefer working with a single clearly defined idea than exploring tension between multiple ideas"; "It is essential to discover one truth, or master one skill, to gain success, rather than address multiple perspectives"; and/or "I am energized by pursuing problems and exploring tension-points."

Still referring to FIG. 1, ability may be determined using a measure of mindset, defined as a trait indicative of a user's beliefs concerning that user's ability to complete tasks and/or to endure adversity. As a non-limiting example, mindset may be measured on a questionnaire using a set of statements and a corresponding set of discrete numerical range entry fields indicating degree of accordance with the statements, such as without limitation "in general I know can accomplish most of my objectives that are important to me"; "when I face challenges I will be able to overcome them successfully"; "when I set my mind I will accomplish my objectives"; and/or "compared to other people I can perform across many difficult situations quite well."

With continuing reference to FIG. 1, a second trait upon which an adaptability score of a user may depend may be character, defined as a time-invariant degree of willingness by a user to adapt to new circumstances. An attribute used to measure character may include personality, which may indicate an aggregation and/or combination of personality traits. For instance, and without limitation, a questionnaire section evaluating personality may record user responses entered using continuous numerical range entry fields indicating degree of accordance of the user with possession of traits, such as statements that the user's personality is reserved, is outgoing, sociable, includes few artistic interests, includes an active imagination, includes a tendency to be lazy, includes a tendency to do a thorough job, includes a tendency to get nervous easily, includes an ability to handle stress well, includes a tendency to find fault with others, and/or includes a tendency to be generally trusting.

Still referring to FIG. 1, a further measure that may be used to indicate character may include motivating style, defined as a set of motivations that inspire a user to perform. Motivating style may, for instance, be measured in a questionnaire by inputting textual answers in textual data entry fields corresponding to prompts such as "Do you think that you could tell me a bit about how you see your work goals?"; "Now, imagine you have just reached an important goal you worked hard towards. This could be a fitness goal like a running distance, or maybe a work-goal such as an advancement. How do you feel?"; and "Tell me a little bit about how you motivate yourself. I know that I motivate myself by thinking about future outcomes and the positive impact my work will have on others. What about you?" Motivating style may further be measured using entries, such as discrete numerical range entries, indicating a degree of accordance with statements such as, without limitation: "I take chances to maximize my goals for advancement"; "If my situation did not allow for advancement, I would likely find a new one"; "I spend a great deal of time envisioning how to fulfill my aspirations"; "I concentrate on completing my work tasks correctly to increase my job security"; "Fulfilling my duties is very important to me"; and/or "I focus my attention on avoiding failures."

With continued reference to FIG. 1, a further attribute that may be measured to determine character may be proactivity, defined as a tendency to act to change a user's current circumstances. For instance, and without limitation, a questionnaire section measuring productivity may do so using inputs at discrete numerical range data entry fields indicative of a degree of accordance with statements such as "I constantly search for new opportunities"; "I love finding ways to make things work better"; "Compared to others I am normally the first one to see a new opportunity"; "When something bothers me I do not wait but change it"; "I am very motivated to translate ideas into realities"; and/or "Even if things get rough I will make it happen."

Still referring to FIG. 1, a further attribute that may be measured to determine character may be grit, defined as a combination of perseverance and passion for very long-term goals; grit may be a measure of user response to setbacks and adversity in achieving long-term goals. For instance, and without limitation, a questionnaire section measuring grit may prompt a user to enter a yes or no answer, for instance using a multiple-choice data entry field, to a question such as "Have you ever achieved a goal that took years of work?"; a "yes" answer may be followed by a text data entry field where a user is prompted to describe the goal. Further measurement of grit may be performed using user entries in, for instance and without limitation, discrete numerical range data entry fields, indicating a degree of accordance with statements such as without limitation "I have overcome setbacks to conquer an important challenge"; "I finish whatever I begin"; "Setbacks don't discourage me"; "I am a hard worker"; "I am diligent."

Continuing to refer to FIG. 1, a third trait upon which an adaptability score of a user may depend may be environment, defined as a degree to which a current or prospective environment boosts or inhibits a user's adaptability; this may be modified in some cases by the user and/or an employer thereof, or may indicate ways in which a user may act to minimize impact of environmental factors tending to reduce the user's adaptability and/or maximize impact of environmental factors tending to enhance the user's adaptability. A non-limiting example of a factor that may be measured to determine environment may include wellbeing, which may be a measure of an overall stress level and/or other emotional impact of a workplace environment on the user. For instance, well-being may be determined by receiving an answer from a user, for instance using a discrete numerical range data entry field, indicating degree of accordance each of a plurality of statements, which may include without limitation "The amount of work I am expected to do within this company is overwhelming"; "I never seem to have enough time to get everything done at this company"; and/or "It often seems like I have too much work for one person to do". Similarly, well-being may be determined by receiving an answer from a user, for instance using a discrete numerical range data entry field, indicating a degree to which the user has experienced an emotion over a period such as the last few months before filling out the questionnaire, which motions may include without limitation a feeling that the user is depressed, down, and/or sad, a feeling that the user is excited, up-beat, and/or joyful, a feeling that the user is anxious, stressed, and/or nervous, and/or a feeling that the user is calm, relaxed, and/or at ease.

Still referring to FIG. 1, a further attribute that may be measured to determine environment may include community, which is defined as a measure of a degree to which interactions with other people in the environment. Community may be measured in a questionnaire section by user entry of yes or no answers, for instance via a multiple-choice data entry field, to questions such as "do you have a manager or someone who mentors you?" and a follow up question "is this something you would like or think could be useful?" Community may further be measured in a questionnaire section by receiving user data entries, for instance via discrete numerical range entry fields, indicating degree of accordance with questions such as "Members within my team/group are able to bring up problems and tough issues"; "People on this team/group sometime reject others for being different"; "It is safe to take a risk on this team/group"; "It is difficult to ask members of my team/group for help"; "If you make a mistake on this team/group, it is often held against you"; "this company cares about my wellbeing"; and/or "this company puts me first before its own goals and concerns."

Further referring to FIG. 1, additional questions regarding environment may include a multiple choice measure of a user's subjective feeling about their environment, such as a question asking "If your workplace was a person, which adjectives would you use to describe them?" with multiple-choice data entries providing options such as "grouchy" vs. "cheerful"; "blue" vs. "warmhearted"; "intense" vs. "tranquil"; and "stimulating" vs. "quiet." A textual entry data field may prompt a user to describe how many friends the user could turn to in a crisis, and another may inquire how many such friends a user could turn to at work. Additional entries may measure a degree of perceived change, for instance and without limitation by using inputs received via discrete numerical entry fields indicating a degree to which a user agrees with statements such as, without limitation "I am often uncertain about how to respond to change"; "I am often unsure about the effect of change on my work and the people around me"; and "I am often unsure how severely a change will affect my work."

Continuing to refer to FIG. 1, additional data may be recorded and/or used as inputs by adaptability assessor 108 in any or all algorithms and/or processes to calculate and/or recalculate adaptability score. For instance, and without limitation, data may include fitness, emotional state, and/or sleep data as collected by wearable devices and/or mobile devices such as smartphones or the like. As a non-limiting example, a person's emotional and/or reaction to a change in environment may be represented by one or more elements of data collected about the person, including without limitation data indicating changes in sleep patterns, heat rate, degree of activity, body weight, or the like. For instance, where an environmental change, such as without limitation a move to a new office, a reduction in ambient light within an office, a change in noise level in an office, a number of people working in an office, a new person working in the office, a previously present person leaving the office, or any other factor relating to environmental change is recorded, one or more elements of wearable and/or mobile device data may be evaluated by adaptability assessor 108 to determine an effect on the user. Similarly, an increase in duties, a requirement to take on a new kind of work, training in a new field, a reorganization, or another change to professional duties and/or content and/or time of work may be recorded and matched to data from a wearable and/or mobile device. As a non-limiting example, where a user's resting heart rate elevate as a result of any or all changes as described above, adaptability assessor 108 may determine that user's stress level has increased; a lowered resting heart rate may indicate a lowered degree of stress. As a further example any change above may be correlated with a change in sleeping patterns; a decrease in hours of sleep may indicate an elevated stress level, while an increase in nightly hours of sleep may indicate a reduced stress level. Increased and/or reduced stress levels as recorded using wearables or other technology may be used in combination with other data to calculate adaptability scores as described below, for instance as inputs to machine-learning processes.

Still referring to FIG. 1, any or all data that may be received and/or used to calculate an adaptability score and/or to create and/or generate an adaptability profile may be received from the user to whom the score and/or profile corresponds, and/or from any other user, person, or device. For instance, another person such as a supervisor, co-worker, spouse, family member, or the like may answer one or more questionnaire questions as described above; these answers may be used instead of or in addition to user entries for the same questions. For instance, numerical scores entered by a user may be aggregated with similar scores entered by another person, where aggregation may include without limitation averaging, calculating arithmetic and/or geometric means, or the like; alternatively separate inputs to machine-learning models, neural nets, and/or machine-learning algorithms, and/or represented in training data, as described below may include entries received from a user and entries received from other persons and/or devices.

Figure 2:
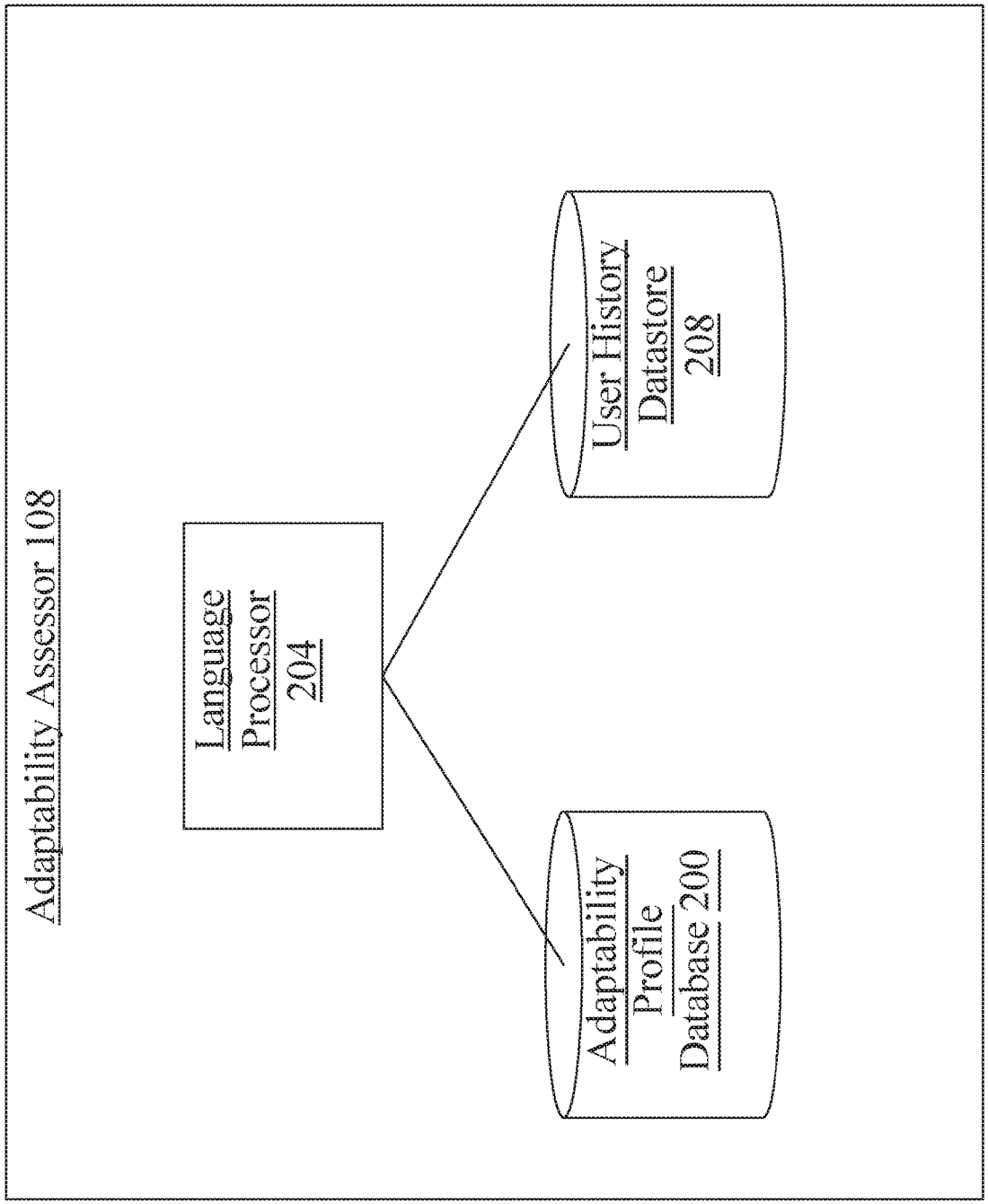
FIG. 2, is a block diagram illustrating an exemplary embodiment of an adaptability assessor.

Referring now to FIG. 2, an exemplary embodiment of an adaptability assessor 108 is illustrated. Adaptability assessor 108 may include an adaptability profile database 200, which may be used to store each user's adaptability scores; as a non-limiting example, adaptability profile database 200 may store each user's measures of ability, character, and environment, and adaptability score may be calculated, as described in further detail below, and stored in a further record, column, and/or database table. Any additional elements of adaptability profile may likewise be stored in adaptability profile database 200. Adaptability profile database 200 may include any data structure for ordered storage and retrieval of data, which may be implemented as a hardware or software module. Adaptability profile database 200 may be implemented, without limitation, as a relational database, a key-value retrieval datastore such as a NOSQL database, or any other format or structure for use as a datastore that a person skilled in the art would recognize as suitable upon review of the entirety of this disclosure. Adaptability profile database 200 may include a plurality of data entries and/or records corresponding to data as described above for entry in adaptability profile database 200. Data entries may be reflected in data entry cells and/or in linked tables such as tables related by one or more indices in a relational database.

Textual entries as entered in textual entry fields as described above may be converted to numerical scores and/or entries usable to look up numerical scores related to stored textual data using a language processor 204. Language processor 204 may be configured to extract, from an element of textual data, one or more words. One or more words may include, without limitation, strings of one or characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Language processor 204 may operate to produce a language processing model 124. Language processing model 124 may include a program automatically generated by language processor 204 to produce associations between one or more words extracted from at least a document and detect associations, including without limitation mathematical associations, between such words, and/or associations of extracted words with numerical scoring values. Associations between language elements, where language elements include for purposes herein extracted words and/or between language elements and scoring data may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given scoring datum. As a further example, statistical correlations and/or mathematical associations may include probabilistic formulas or relationships indicating a positive and/or negative association between at least an extracted word a scoring datum; positive or negative indication may include an indication that a given word is or is not indicating a particular scoring datum.

Still referring to FIG. 2, language processor 204 may generate the language processing model 124 by any suitable method, including without limitation a natural language processing classification algorithm; language processing model 124 may include a natural language process classification model that enumerates and/or derives statistical relationships between input term and output terms. Algorithm to generate language processing model 124 may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word and another extracted word. There may be a finite number of scoring data to which an extracted word may pertain; an HMM inference algorithm, such as the forward-backward algorithm or the Viterbi algorithm, may be used to estimate the most likely discrete state given a word or sequence of words. Language processor 204 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 2, generating language processing model 124 may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 2, language processor 204 may use a corpus of textual data, including without limitation past user entries to questionnaire data fields, and/or any other corpus as described in further detail in this disclosure, to generate associations between language elements in a language processor 204. Statistics measuring word concurrences or other relationships for language processing model 124s and/or vector spaces may be collected within such a corpus.

Continuing to refer to FIG. 2, adaptability score may be calculated and/or recalculated as a mathematical expression of components of adaptability score as described above. Mathematical express may be user-entered based on empirical observations concerning adaptability; alternatively or additionally, adaptability assessor 108 may perform a machine-learning process to create mathematical expression as a machine-learning model. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 2, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data to develop a mathematical expression for adaptability score may include data correlating questionnaire answer patterns as described above to adaptability score levels of people who answered such questionnaires as provided by managers, experts, or the like and entered in system 100; such data may be collected by providing surveys to managers, experts, or co-workers. Alternatively or additionally, experts may enter training data created synthetically to match potential answers to adaptability scores.

Still referring to FIG. 2, adaptability assessor 108 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure. Regression may include multilevel mixed-effects models that recognize the existence of such data hierarchies by allowing for residual components at each level in the hierarchy, and conditional process analysis with non-parametric tests, such as mediation analysis using bootstrapping, which involved repeatedly randomly sampling observations with replacement from the data set to compute the desired statistic in each resample and provides point estimates and confidence intervals by which one can assess the significance or non-significance of a mediation effect.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 2, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may questionnaire responses and/or scores as inputs, adaptability scores as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs.

Still referring to FIG. 2, adaptability assessor 108 may further include a user history datastore 208; user history datastore may include past adaptability scores and/or data used to calculate past adaptability scores. When a user's adaptability score is recalculated, for instance as descried below, a new adaptability score resulting from the recalculation may be entered in adaptability score database, and the previous adaptability score may be recorded in user history datastore.

Referring again to FIG. 1, communication device 104 is configured to initiate a textual communication session with a user, as described in further detail below. A textual communication session, as used in this disclosure, is a network communication session during which a plurality of textual exchanges between a user and communication device 104 occur using a user client device 112; each textual exchange of plurality of textual exchanges includes a first textual datum entered by the user and a second textual datum outputted by communication device 104. Textual communication session may be performed using a chat window 116, which user client device 112 may display, and in which user inputs and/or communication device 104 outputs may be visible to user.

Still referring to FIG. 1, communication device 104 may be configured to perform further method steps and/or embodiments thereof as described below, including identification of adaption problem categories. Communication device 104 may include an adaptation category database 120; adaptation category database 120 may list adaptation categories and/or words and/or phrases linked to such categories. Words and/or phrases may be entered into adaptation category database 120 in canonical forms, which may be related to other words by language processing model 124; language processing model 124 may include any language processing model 124 as described above.

With continued reference to FIG. 1, communication device 104 may be configured to generate at least an adaption solution. In an embodiment, communication device 104 may include an adaption solution database 128, which may identify one or more third-party solution providers (not shown) as described in further detail below, one or more response phrases, one or more informational suggestions, and/or other information usable to generate adaption solutions as described in further detail below. Communication device 104 may include at least an adaption solution model 132, which may be generated using machine learning, including any machine learning as described above, and may link sets of data to adaption solutions via mathematical expressions and/or trained neural nets, as described in further detail below.

Still referring to FIG. 1, communication device 104 may include a conversational response database 136; conversational response database 136 may include, without limitation, any database or datastore suitable for use as any other database described in this disclosure. In an embodiment, conversational response database 136 may include one or phrases, sentences, and/or fragments thereof that communication device 104 may be able to use in generating textual outputs as described in further detail below.

Still referring to FIG. 1, communication device 104 may include a resource identifier database 140; resource identifier database 140 may include, without limitation, any database or datastore suitable for use as any other database described in this disclosure. In an embodiment, resource identifier database 140 may include data identifying resources that may be able to aid a user with adaptability ability training, skill training, emotional support or the like as described in further detail below. Resource identifier database 140 may include links, such as universal resource locator (URL) links to remote devices operated by and/or offering resources.

Figure 3:
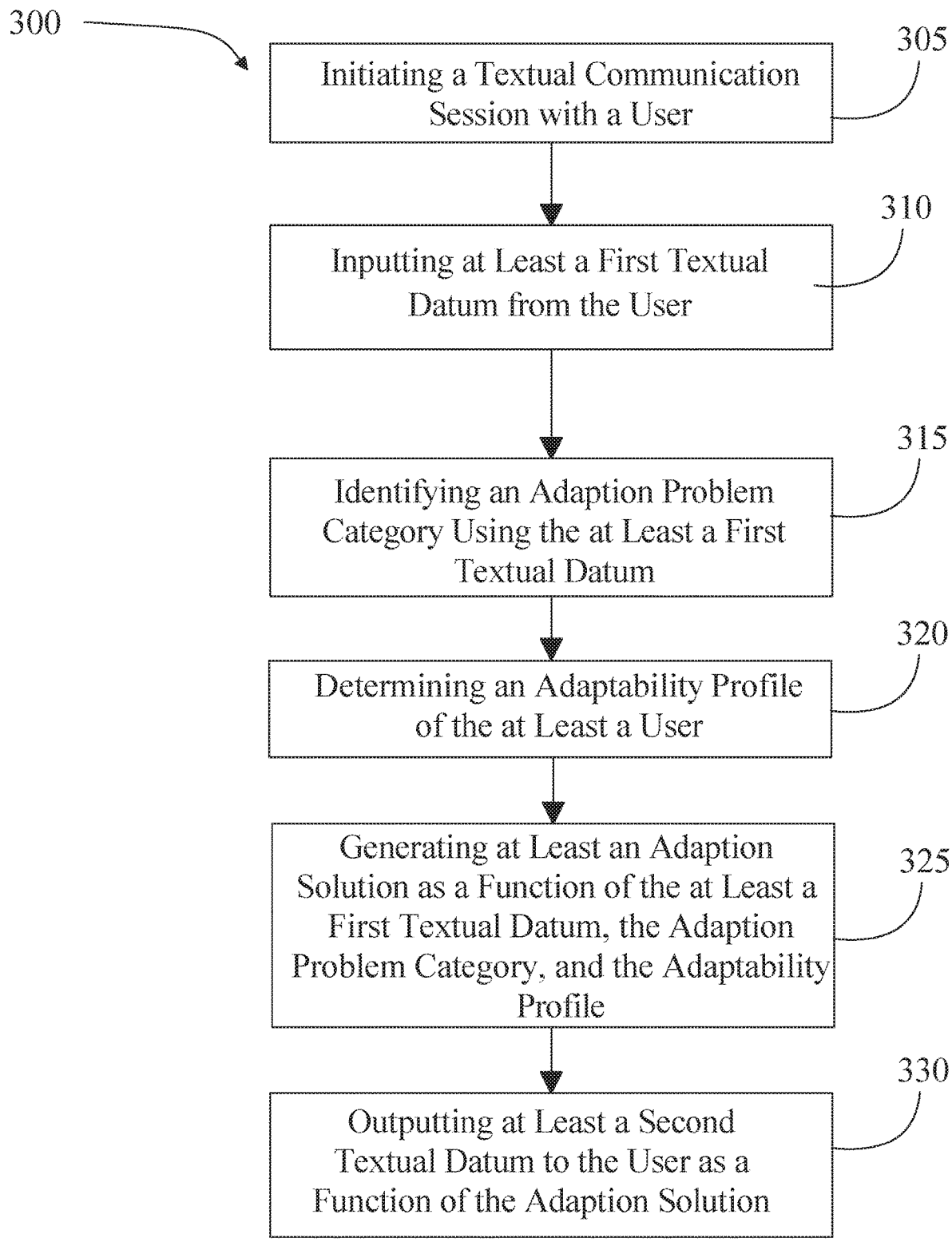
FIG. 3 is a flow diagram illustrating an exemplary embodiment of a method of improving user adaptability using textual communication.

Referring now to FIG. 3, an exemplary embodiment of an artificial intelligence method 300 of improving user adaptability using textual communication is illustrated. At step 305, a communication device 104 initiates a textual communication session with a user. Textual communication session may be performed using any textual communication as described above, for instance between communication device 104 and user via a user client device 112. Initiation may be in response to a user input requesting initiation; in other words, initiation may include receiving, from the user, an instruction to initiate the textual communication session and initiating the textual communication session as a function of the instruction. For instance, user may select a link or other event handler triggering initiation of communication session. Communication session may alternatively or additionally be automatically performed in response to one or more events, which for purposes herein may be described as "adaptation challenges" indicative of a likely need for a user communication session as described in this disclosure; in other words, initiating the textual communication session with the user may include detecting an adaptation challenge and initiating the textual communication session as a function of the adaptation challenge. Detecting the adaptation challenge may include detecting a status event; for instance, a website may modify a posted description associated with the user's role, a change in structure around the user, a new required training, a new required skill and/or skill set, or the like. Such a posting may include a posting that is not available to general public, such as a posting regarding a disciplinary action or other adverse action performed with regard to user, which may be accessible only given valid credentials; communication device 104 may have such credentials, or may receive a transmission from another device associated with employer and/or user. Status event may be received from a third-party device such as a social networking device, a device operated by a standards and/or licensing organization involving user or of which user is a member, and/or from a user client device 112, for instance, upon entry of data describing status event by user.

Still referring to FIG. 3, a third-party communication identifying an adaptation challenge may be received from another user or person, such as a person responsible for overseeing user's task completion and/or development, who may be aware of an adaptation challenge such as a need for retraining or the like. Alternatively or additionally, detecting an adaptation challenge may include detecting a scheduled adaptation challenge event. A scheduled adaptation challenge event may be any scheduled action including a training session, a training class, or any other action scheduled in connection with an adaption solution as described in further detail below.

At step 310, and still referring to FIG. 3, communication device 104 inputs at least a first textual datum from the user using the textual communication session. In an embodiment, inputting the at least a first textual datum may include inputting a plurality of first textual data. Plurality of first textual data may include a series of sentences, posts, or the like entered by a user; a user may enter information pertaining to an adaptation challenge or other adaptation-related question or concern, for instance to enter a question and/or concern in narrative form. In an embodiment, plurality of first textual inputs is generated by a prompt from communication device 104 followed by a response from user. In other words, at least a first textual datum and/or plurality of first textual data may include inputting at least an initial textual datum, outputting a response textual datum, and inputting at least a subsequent textual datum in in response to the response textual datum. Communication device 104 may aggregate two or more textual data to generate at least an aggregate first textual datum; generating at least an aggregate first textual datum may include combining at least an initial textual datum with at least a subsequent textual datum and/or response textual datum may be combined with at least a subsequent textual datum.

With continued reference to FIG. 3, textual input may include, without limitation, an audio and/or voice input. Audio and/or voice input may be received from a user in recorded, streamed or other form; for instance, and without limitation, audio and/or voice input may be input by user in a microphone or other audio input device, recorded as an audio recording which may be received at communication device as a file such as an MP3 file or the like, received as audio streaming content from a user device such as a mobile device, smartphone, or the like, and/or by any other suitable process. Audio input may include, without limitation, an audio portion of a video input; video and/or visual portions of input may be received as well. Communication device may convert audio input into textual data using any suitable process, hardware, and/or software, including any suitable implementation of speech-to-text algorithms or the like.

At step 315, and still referring to FIG. 3, communication device 104 identifies, using a language processing model 124, at least an adaption problem category using the at least a first textual datum. An adaption problem category, as used in this disclosure, is a datum identifying a particular form of adaption problem solution that a user requires. At least an adaption problem category may include an immediate solution category, which may include one or more adaptation categories describing a change, external to the user, to which the user must react, such as an upcoming change in description of responsibilities, role, location, required skills, or the like. For instance, user may enter a first textual datum that may indicate a short-term adaption problem posed by a need to learn a new skill set and another adaption problem involving need for emotional support or advice in adjusting to new circumstances. At least an adaption problem may include an adaptability improvement adaption problem category, which may include one or more adaptability problems relating to a need to improve a user's adaptability score, particularly in with regard to the above-described ability and environmental traits. At least an adaption problem category may include both a short-term adaption problem category and an adaptability improvement adaption problem category.

Still referring to FIG. 3, identification of an adaption problem category may include, without limitation, analysis of user emotion. For instance, and without limitation, data from wearable and/or mobile devices describing resting heart rate, amount of sleep, and/or degree of physical activity may be recorded at communication device 104 and/or used as emotional state inputs in processes as described in further detail below. As a further non-limiting example, user emotional state may be determined using analysis of text; for instance and without limitation, a machine-learning and/or neural net process and/or model, which may be any such process or model as described in this disclosure, may be trained with data matching particular words and/or phrases to emotional states of users in general and/or the instant user. For instance, user and/or another user may be asked periodically to rate emotional state while submitting textual, video, and/or audio data; each such entry may be used to create training data, which may include any training data as described herein, correlating particular words, phrases, syntax, tone of voice, typing cadence, volume of voice, facial expressions or the like to emotional states, and which may in turn be used by communication device 104 to generate machine-learning models, neural networks, or the like for determining a user state from particular words, phrases, syntax, tone of voice, typing cadence, volume of voice, facial expressions or the like submitted in and/or with user textual entry. Training data and/or models may be user-specific; for instance, a baseline profile may be established for each or any input as described above, including without limitation particular words, phrases, syntax, tone of voice, typing cadence, volume of voice, facial expressions or the like, such that a deviation from any such particular words, phrases, syntax, tone of voice, typing cadence, volume of voice, facial expressions or the like may be detectable. Training data and/or machine learning processes may be used to determine an emotional state from a variance from user-specific baselines; for instance, users who are typing unusually slowly relative to their usual pace may be discouraged or depressed, user speaking at an unusually high volume may be anxious and/or angry, or the like. Communication device may use voice tonal analysis, facial expression analysis, or any other suitable information to detect emotional states. Communication device 104 may translate a detected emotional state into a word, which may be combined with other words from textual entry for language analysis, retrieval of adaption problems from databases, or any other process as described herein for determination of adaption problems, solutions, and/or scores using textual data. For instance, and without limitation, a user emotion detected according to any of the above processes may be added to textual data as a label corresponding to a name of the emotional state, such as "angry," "sad," "exited," "depressed," "anxious," "bemused," "happy," "jocular," or the like, and appended to and/or included with user textual entries. Alternatively or additionally, one or more words describing a user's emotional state may be received from the user and/or from other people around the user.

With continued reference to FIG. 3, at least an adaption problem category may identify a skill deficit. At least an adaption problem category may identify an information deficit, defined as a need to know about a current and/or planned occurrence, a resource, or the like. At least an adaption problem category may identify an emotional deficit, such as an ability and/or character-related trait that makes adaptation difficult. At least an adaption problem category may indicate an organizational deficit, defined as describing a lack of ability or inclination on the part of user to plan time, tasks, and/or learning processes effectively. At least an adaptability problem may identify a deficit in ability with regard to adaptability as described above.

Extraction and/or analysis may further involve polarity classification, in which communication device 104 may determine, for instance, whether a phrase or sentence is a negation of the semantic content thereof, or a positive recitation of the semantic content; as a non-limiting example, polarity classification may enable communication device 104 to determine a negation of a statement may have an opposite meaning from the statement without negation. Polarity classification may be performed, without limitation, by consultation of a database of words that negate sentences, and/or geometrically within a vector space, where a negation of a given phrase may be distant from the non-negated version of the same phrase according to norms such as cosine similarity.

With continued reference to FIG. 3, communication device 104 may extract and/or analyze one or more words or phrases by performing dependency parsing processes; a dependency parsing process may be a process whereby communication device 104 and/or a language processing module communicating with and/or incorporated in communication device 104 recognizes a sentence or clause and assigns a syntactic structure to the sentence or clause. Dependency parsing may include searching for or detecting syntactic elements such as subjects, objects, predicates or other verb-based syntactic structures, common phrases, nouns, adverbs, adjectives, and the like; such detected syntactic structures may be related to each other using a data structure and/or arrangement of data corresponding, as a non-limiting example, to a sentence diagram, parse tree, or similar representation of syntactic structure. Communication device 104 may be configured, as part of dependency parsing, to generate a plurality of representations of syntactic structure, such as a plurality of parse trees, and select a correct representation from the plurality; this may be performed, without limitation, by use of syntactic disambiguation parsing algorithms such as, without limitation, Cocke-Kasami-Younger (CKY), Earley algorithm or Chart parsing algorithms. Disambiguation may alternatively or additionally be performed by comparison to representations of syntactic structures of similar phrases as detected using vector similarity, by reference to machine-learning algorithms and/or modules such as without limitation a user communication learner 1804 as described below, or the like.

Still referring to FIG. 3, identifying the adaptation identifying the adaption problem category using the at least a first textual datum may include matching the at least a first textual datum to a semantic identifier of the adaption problem category. A "semantic identifier" as used herein may include a datum such as a string or other identifying datum that is linked to an adaption problem category, for insane in adaptation category database 120. In an embodiment semantic identifier may be parsed from at least a first textual datum. Communication device 104 may use language processing model 124 to determine whether at least a first textual datum represents a false match with semantic identifier; for instance, at least a first textual datum may contain a string that matches semantic identifier, but which is embedded in a longer phrase having a divergent meaning and/or sense. Such a false-positive may be detected, without limitation, in a vector-space language model by determining that a vector containing the larger phrase has a widely divergent direction from a vector representing the string, as measured for instance using cosine similarity, which may indicate that the larger phrase is a negation or otherwise widely divergent statement from the string taken in isolation. Alternatively or additionally, where language processing model 124 uses a non-vector based matching protocol, language processing model 124 may match a larger phrase and/or sequence to a divergent meaning from semantic identifier. Language processing model 124 may alternatively or additionally be used to perform negation detection, such as by detecting use of negation words such as "not," "aren't," or the like.

Continuing to refer to FIG. 3, matching at least a first textual datum to a semantic identifier of the adaption problem category may include matching at least a datum of the first textual datum to at least a canonical form matching the first textual datum to the semantic identifier using the at least a canonical form. A "canonical form," as used herein, is a word or phrase used by language processing model 124 to represent various different words and/or phrases having similar and/or identical meanings; as a non-limiting example, a word or phrase used as a semantic identifier, for instance in adaptation category database 120 as described above, may have various synonyms that users, or a particular user, may use instead. Synonyms may present a challenge in database lookup, which tends to rely on traditional string comparison. Language processing model 124 may use synonym detection, for instance via vector similarity or the like, to identify one or more synonyms of a word and/or phrase in at least a first textual datum and may determine that the one or more synonyms include a canonical form of a word or phrase. Communication device 104 may then use the canonical form to look up data describing an adaption problem category in adaptation category database 120. Alternatively or additionally, canonical form may be used directly as adaption problem category.

Still referring to FIG. 3, matching at least a first textual datum to at least an adaption problem category may include matching a word or phrase from a single user post. Alternatively or additionally, two or more posts may be combined into a textual datum which may be patched to at least an adaption problem category; two or more posts may include, without limitation, an initial textual datum, a response textual datum, and/or a subsequent textual datum as described above. As a non-limiting example, a series of user posts may be concatenated and/or otherwise combined to be matched to one or more semantic identifiers. As a further non-limiting example, a post generated by communication device 104 and a post received from user in response may be concatenated together to create a textual datum that may be matched to at least a semantic identifier—in other words, a user response to a typical and/or stock question or prompt may have a meaning within language model that is affected and/or modified by such a stock question or prompt.

With continued reference to FIG. 3, language model may be generated using any language processing methods as described above, including without limitation using a corpus of text. Communication device 104 may initialize corpus by collecting and/or receiving a body of documents, which may include without limitation web pages, books, articles, email messages and/or other correspondence, and/or excerpts thereof; initialized corpus may be used to generate a first iteration and/or generation of language model. Communication device 104 and/or another device connected to and/or in communication with system 100, may generate a second generation and/or version of language model that is more specifically tailored to user conversations with system 100; communication device 104 may, for instance, generate a general corpus by compiling a plurality of textual conversations with a plurality of users and generate a language model using the corpus. In an embodiment, this approach may ensure that a large body of text pertaining to conversations regarding adaptability may be available to generate a language processing model 124 having a comprehensive range of system 100-specific vocabulary of words and/or phrases; communication device 104 may, for instance, update and/or modify a language model generated using an initial corpus to generate a language model using a general corpus, permitting a broad and statistically significant model using initial corpus, tailored to the system 100-specific vocabulary of general corpus.

Still referring to FIG. 3, communication device 104 may generate a user-specific language processing model 124. Communication device 104 may generate user-specific language processing model 124 using a user-specific corpus. User-specific corpus may include a plurality of textual data from text entered by user and/or from textual conversations engaged in by user; user-specific corpus may include, for instance, user textual conversations performed on other platforms, user electronic mail communications, or the like, to which user may provide system 100 and/or communication device 104, or which user may provide to system 100 and/or communication device 104. Communication device 104 may alternatively or additionally generate user corpus using an initial textual conversation with user; initial textual conversation may include, without limitation a stock questionnaire sequence, wherein initial conversation includes receiving user inputs in response to various prompts. Initial textual conversation may, for instance, take the form of an "interview" of user concerning adaptability score process, concerning work, and/or covering a range of topics which may be related and/or unrelated to adaptability. Initial textual conversation may include a series of questions soliciting user feedback regarding an adaptability questionnaire as described above; such feedback may involve user communication of various emotions and/or user-specific vocabulary relevant to adaptability scoring processes, adaptability score-related vocabulary, or the like. User-specific language processing model 124 may be generated without limitation, by updating and/or modifying initial language processing model 124 using user-specific corpus, and/or by updating and/or modifying a language model generated using general corpus as described above; updating and/or modifying may be performed using any language processing algorithms and/or processes as described above. As an example, and without limitation, identifying an adaption problem category using at least a first textual datum may include collecting a user-specific corpus of conversational data and identifying the adaption problem category using the user-specific corpus of conversational data. Collecting the user-specific corpus of conversational data may include performing an initial conversation sequence with the user and collecting the initial conversation sequence into the user-specific corpus of conversational data.

Still referring to FIG. 3, each language model may be periodically or continuously updated. Periodic and/or continuous updates may be performed using one or more language processing algorithms as described above; for instance, an updated initial corpus, general corpus, and/or user-specific corpus may be used to generate and/or update any language model as described above. Initial corpus, general corpus, and/or user-specific corpus may be continually or periodically updated. For instance, and without limitation, general corpus may be updated with new user conversations each time such conversations occur; updating may include without limitation appending to an existing corpus by concatenation to an end of existing corpus. In an embodiment, and without limitation, updates to language models may enable system and/or communication device 104 to continually learn to communicate more effectively with user.

In an embodiment, and still referring to FIG. 3, one or more conversational responses to user may be generated using language processing model 124. For instance, and without limitation, one or more conversational responses may include prompts and/or requests for further information. Conversational responses may be retrieved from conversational response database 136; retrieval may include creation of a query including one or more words and/or phrases from textual communication session and retrieving a response using the query. Generating query may include converting one or more phrases to canonical versions of one or more phrases; this may be performed as described above for generation of canonical versions of at least a first textual datum. In an embodiment, communication device 104 may compare a degree of match of at least a first textual datum to one or more canonical forms to a threshold number, which may, for instance, represent a degree of cosine similarity or other measure of similarity in language processing as described above; where degree of match fails the threshold comparison, indicating for example that degree of cosine similarity to any canonical form is not sufficiently high. Each of the above matching processes may be performed with one or more textual data describing user emotional state; textual data describing user emotional state may be treated, in an embodiment, as a portion of user textual submission. Alternatively or additionally communication device 104 may determine that two or more canonical forms match to at least a first textual datum. In either case, communication device 104 may generate a conversational response requesting additional information from user; a user response may be received and added to at least a first textual datum. Communication device 104 may perform the above method steps iteratively until only one canonical form matches at least a first textual datum and/or until a match between at least a first textual datum and a canonical form passes a threshold test of similarity as described above.

At step 320, and still referring to FIG. 3, communication device 104 determines an adaptability profile of the at least a user; determining an adaptability profile may include, without limitation, determining an adaptability score of the at least a user. This may be performed, without limitation, by presenting a questionnaire to the user as described above; one or more machine-learning processes as described above may be performed to calculate the score as described above. Alternatively or additionally, the score may be calculated by analyzing one or more additional statements by user as described above regarding analysis of textual data entry fields, for instance using language processor. Calculation of adaptability score may be performed at any point in method, including before and/or after steps 305, 310, and/or 315 as described above; calculation of adaptability score may be performed by analyzing at least a first textual submission as described above for analysis of textual data entries in questionnaires. Alternatively or additionally, adaptability score may be calculated earlier and stored, for instance, in adaptability profile database 200. Such approaches may be combined; for instance, an initially calculated adaptability score may be updated and/or recalculated using at least a first textual input. Persons skilled in the art, upon reviewing the entirety of this disclosure, will be aware of a number of variations on score calculation that may be practiced within the scope of this disclosure.

At step 325, and still referring to FIG. 3, the communication device 104 generates at least an adaption solution as a function of the at least a first textual datum, the adaption problem category, and the adaptability score. Kinds of adaption solutions generated may depend on one or more factors such as, without limitation, adaption problem category. For instance, and without limitation, where adaption problem category includes a skill deficit, adaption solution may identify and/or enroll the user in one or more training programs and/or courses. As another non-limiting example, where adaption problem category is an information deficit, ID an information deficit, an adaption solution may provide them with information they need right now; such as responses to questions, links to a website with the resource needed, identity of another person the user can interact with, or the like. Where the adaption problem is an emotional deficit, adaption solution may provide a response output that helps deal with the emotional difficulty, such as a piece of advice, contact of a person that may be able to assist, or the like. Where the adaption problem category identifies an organizational deficit, adaption solution may provide scheduling resources and/or training usable to improve scheduling and/or other executive function skills. Where adaption problem category identifies an adaptability deficit adaption solution may develop an adaptability program to improve adaptability. Where adaption problem category is a reminder to attend or perform a scheduled training event or practice session, adaption solution may include statement encouraging user to attend and/or perform the scheduled training event and/or practice session. Where the adaption problem category identifies a past or current non-compliance with a scheduled process as described above, an adaption problem solution may include a message intended to encourage a user to comply; a message may further be generated and/or transmitted to another user who may assist in reminding and/or encouraging the user regarding compliance.

In an embodiment, and still referring to FIG. 3, where the adaption problem represents a user's desire and/or intention to improve adaptability ability and/or interaction with environment as described above, and/or to improve other soft skills such as grit, adaption solution may include a resource, course, coaching session, and/or regular practice to improve the improve adaptability ability and/or interaction with environment as described above, and/or to improve other soft skills. Short-term and long-term solutions may be combined; for instance, analysis of at least a first user textual datum may indicate user needs immediate help overcoming a skill deficit as well as a longer-term program to improve adaptability ability and/or interaction with environment as described above, and/or to improve other soft skills; adaption solution may combine each of the above together, to address both concerns. Adaption solution may include a long-term and/or ongoing solution, such as without limitation a series of interventions, classes, exercises, therapy sessions, or the like.

With continued reference to FIG. 3, generation of adaption solution may be performed, without limitation, by combining the at least a first textual datum, the adaption problem category, and the adaptability core into a query and using the query to retrieve one or more solution selections from at least a database; at least a database may include an adaption solution database 128 as described above. As a further non-limiting example, at least a database may include a conversational response database 136, where, for instance, a statement containing advice and/or guidance may be retrieved. At least a database may include a resource identifier database 140. In an embodiment, one or more textual data from at least a first textual datum may be converted to one or more canonical forms, which may be combined to create and/or be added to query Alternatively or additionally, generating the at least an adaption solution may include receiving training data correlating combinations of adaption problem categories, textual data, and adaptability scores with adaption solutions, and generating the adaption solution using a machine-learning process as a function of the adaption problem category, the first textual datum, the adaptability score, and the training data. Training data may include any training data as described above; training data may be compiled and/or collected from previous interactions with system and/or from entries by experts or other users describing adaptations solutions that have worked, and the circumstances under which they were applied.

Still referring to FIG. 3, machine learning may be performed using linear regression models as described above. Machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 3, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may questionnaire responses and/or scores as inputs, adaptability scores as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs.

At step 330, and still referring to FIG. 3, communication device 104 outputs at least a second textual datum to the user as a function of the adaption solution. At least a second textual datum may include any data suitable for use as at least a first textual datum and/or at least a response datum. Where adaption solution includes a sentence or phrase, the sentence or phrase may be included in at least a second textual datum. Outputting may include combining at least an adaption solution with one or more conversational outputs. For instance, and without limitation, one or more conversational responses may be retrieved from conversational response database 136; retrieval may include creation of a query including one or more words and/or phrases from textual communication session and retrieving a response using the query. Generating query may include converting one or more phrases to canonical versions of one or more phrases as described above. As an illustrative example, at least a second textual datum may combine a link to a training course, a calendar update, or other identification of and/or link to a resource with a conversational output explaining the purpose of the resource, providing instructions for use of the resource, or the like. Persons skilled in the art, upon reviewing the entirety of this disclosure, will be aware of various ways in which at least a second textual datum may be generated consistently with the instant disclosure.

Still referring to FIG. 3, in an embodiment, adaptability score may be updated as a result of generation of adaption solution and/or information indicative of user action to make use of adaption solution. For instance, and without limitation where user is enrolled in a training class or group to aid in improving adaptability ability as described above, enrollment in the training class, completion of one or more stages, classes, or other material relating to the training class, or the like may be used as an input to any adaptability scoring process; adaptability score may be recalculated using the inputs. A user may be provided an output indicating an improved or otherwise changed adaptability score, which may help to incentivize further improvement.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
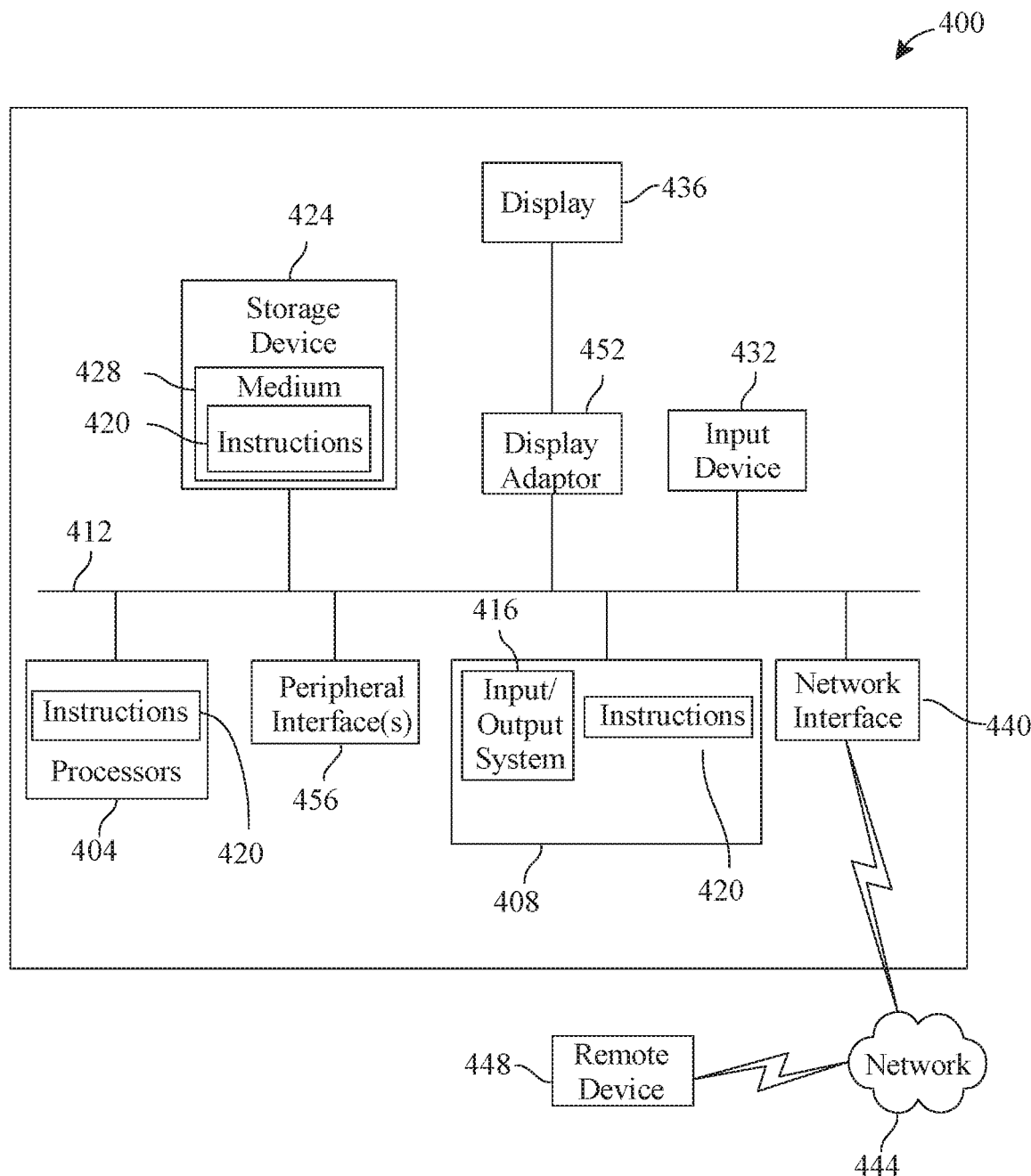
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems as disclosed herein. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An artificial intelligence method of improving user adaptability using textual communication, the method comprising:
   initiating, at a communication device, a textual communication session with a user;
   displaying, by the communication device and using at least a user client device,
      an electronic questionnaire configured to receive a plurality of user attributes, wherein the electronic questionnaire comprises continuous numerical range entry fields, wherein the plurality of user attributes comprises a measure of:
      an ability attribute, wherein the ability attribute comprises a measure of flexibility and a measure of mindset, a character attribute comprising a motivating style and a proactivity and a community attribute comprising a measure of degree of user interaction
      receiving, at the communication device, and using the at least a user client device and the questionnaire, a first plurality of user attributes from the user
      receiving, at the communication device, and using the at least a user client device and the questionnaire, a second plurality of user attributes from a distinct person from the user;
   inputting, at the communication device and using the textual communication session, at least a first textual datum from the user or the distinct person from the user;
   identifying, at the communication device and using a language processing model, at least an adaption problem category from a plurality of adaption problem categories each identifying a form of adaption problem solutions using the at least a first textual datum, wherein identifying the adaption problem category further comprises:
   identifying a current user emotion state using the at least a first textual datum such that the current user emotion state is the emotion of the user in the moment of inputting the at least a first textual datum and wherein the adaption problem category is associated with the current user emotion state;
   collecting a user-specific corpus of previous textual data;
   and identifying the at least an adaption problem category using the user-specific corpus of previous textual data, wherein identifying the at least an adaption problem category further comprises:
   identifying, using the language processing model and a vector similarity test, a canonical form the first textual datum, wherein the canonical form is a semantic synonym of the first textual datum that is distinct from the first textual datum
   querying an adaption category database using the canonical form; and retrieving, from the adaption category database and using the query, a semantic identifier of the at least an adaption category;
   determining, at the communication device, an adaptability profile of the user based on the semantic identifier of the at least an adaption category, wherein the adaptability profile includes an adaptability score, wherein the adaptability score is calculated using user data recorded by a wearable device worn by the user, wherein the user data includes:
   sleep data of the user, as collected by the wearable device, reflective of a change in a sleeping pattern of the user wherein the change in the sleeping pattern of the user is correlated to an environmental change experienced by the user, wherein the environmental change includes a change in a work environment of the user, wherein the change in the work environment of the user includes a move to a new work location for the user and an increase in work duties of the user;
   and heart rate of the user, as collected by the wearable device, reflective of a stress level;
   training, at the communication device, a linear regression machine-learning process, wherein the linear regression machine-learning process is trained by a training data, the training data correlating combinations of adaption problem categories, textual data, and adaptability profiles with adaption solutions and wherein the trained linear regression machine-learning process is configured to receive the adaptability profile of the at least a user, the at least a first textual datum, and the identified adaption problem category associated with the current user emotion state as inputs and output at least an adaption solution, wherein the adaption solution provides a solution to the current user emotion state and comprises contact information of an entity that assists with the current user emotion state;
   outputting, at the communication device, at least a second textual datum to the user as a function of the adaption solution, wherein the at least a second textual datum comprises a link to the contact information;

and updating the adaptability score based on information indicative of user action to make use of the adaption solution.

2. The method of claim 1, wherein inputting at least a first textual datum from the user further comprises inputting a plurality of first textual data.

3. The method of claim 2, wherein inputting the plurality of first textual data further comprises:
inputting at least an initial textual datum;
outputting a response textual datum; and
inputting at least a subsequent textual datum in response to the response textual datum.

4. The method of claim 3, further comprising generating at least an aggregate first textual datum by combining the response textual datum with the at least a subsequent textual datum.

5. The method of claim 2, further comprising aggregating the plurality of first textual data into an aggregate first textual datum.

6. The method of claim 1, wherein collecting the user-specific corpus of previous textual data further comprises:
performing an initial conversation sequence with the user; and collecting the initial conversation sequence into the user-specific corpus of previous textual data.

7. An artificial intelligence system for improving user adaptability using textual communication, the system comprising: a computing device, the computing device comprising a graphical user interface and configured to:
initiate a textual communication session with a user;
input, using the textual communication session, at least a first textual datum from the user;
displaying, by the communication device and using at least a user client device, an electronic questionnaire configured to receive a plurality of user attributes, wherein the electronic questionnaire comprises continuous numerical range entry fields, wherein the plurality of user attributes comprises a measure of: an ability attribute, wherein the ability attribute comprises a measure of flexibility and a measure of mindset, a character attribute comprising a motivating style and a proactivity; and a community attribute comprising a measure of degree of user interaction;
receiving, at the communication device, and using the at least a user client device and the questionnaire, a first plurality of user attributes from the user;
receiving, at the communication device, and using the at least a user client device and the questionnaire, a second plurality of user attributes from a distinct person from the user;
identify, using a language processing model, at least an adaption problem category from a plurality of adaption problem categories each identifying a form of adaption problem solutions using the at least a first textual datum, wherein identifying the adaption problem category further comprises:
identifying a current user emotion state using the at least a first textual datum such that the current user emotion state is the emotion of the user in the moment of inputting the at least a first textual datum and wherein the adaption problem category is associated with the current user emotion state;
collecting a user-specific corpus of previous textual data; and identifying the at least an adaption problem category using the user-specific corpus of previous textual data, wherein identifying the at least an adaption problem category further comprises:
identifying, using the language processing model and a vector similarity test, a canonical form the first textual datum, wherein the canonical form is a semantic synonym of the first textual datum that is distinct from the first textual datum; querying an adaption category database using the canonical form; and
retrieving, from the adaption category database and using the query, a semantic identifier of the at least an adaption category;
determine an adaptability profile of the user based on the semantic identifier of the at least an adaption category, wherein the adaptability profile includes: an adaptability score, wherein the adaptability profile includes an adaptability score, wherein the adaptability score is calculated using user data recorded by a wearable device worn by the user, wherein the user data includes: sleep data of the user, as collected by the wearable device, reflective of a change in a sleeping pattern of the user, wherein the change in the sleeping pattern of the user is correlated to an environmental change experienced by the user, wherein the environmental change includes a change in a work environment of the user, wherein the change in the work environment of the user includes a move to a new work location for the user and an increase in work duties of the user; and heart rate of the user, as collected by the wearable device, reflective of a stress level;
train a linear regression machine-learning process, wherein the linear regression machine-learning process is trained by a training data, the training data correlating combinations of adaption problem categories, textual data, and adaptability profiles with adaption solutions and wherein the trained linear regression machine-learning process is configured to receive the adaptability profile of the at least a user, the at least a first textual datum, and the identified adaption problem category associated with the current user emotion state as inputs and output at least an adaption solution, wherein the adaption solution provides a solution to the current user emotion state and comprises contact information of an entity that assists with the current user emotion state;
output at least a second textual datum to the user as a function of the adaption solution, wherein the at least a second textual datum comprises a link to the contact information;
and update the adaptability score based on information indicative of user action to make use of the adaption solution.

8. The system of claim 7, wherein the computing device is further configured to input at least a first textual datum from the user by inputting a plurality of first textual data.

9. The system of claim 8, wherein inputting the plurality of first textual data further comprises:
inputting at least an initial textual datum; outputting a response textual datum; and
inputting at least a subsequent textual datum in response to the response textual datum.

10. The system of claim 9, wherein the computing device is further configured to generate at least an aggregate first textual datum by combining at least response textual datum with at least a subsequent textual datum.

11. The system of claim 8, wherein the computing device is further configured to aggregate the plurality of first textual data into an aggregate first textual datum.

12. The system of claim 1, wherein collecting the user-specific corpus of previous textual data further comprises:
   performing an initial conversation sequence with the user; and
   collecting the initial conversation sequence into the user-specific corpus of previous textual data.

13. The method of claim 1, wherein the current user emotion state is identified as at least one of angry, sad, depressed and anxious.

14. The system of claim 7, wherein the current user emotion state is identified as at least one of angry, sad, depressed and anxious.

* * * * *